United States Patent [19]

Hidaka

[11] Patent Number: 4,934,327
[45] Date of Patent: Jun. 19, 1990

[54] KNOCK-SUPPRESSIVE SPARK IGNITION TIMING CONTROL SYSTEM FOR AN INTERNAL COMBUSTION ENGINE WITH A VARIABLE RETARD LIMIT

[75] Inventor: Terufumi Hidaka, Kanagawa, Japan

[73] Assignee: Nissan Motor Company, Limited, Yokohama, Japan

[21] Appl. No.: 237,039

[22] Filed: Aug. 29, 1988

[30] Foreign Application Priority Data

Aug. 31, 1987 [JP] Japan ................. 62-216591

[51] Int. Cl.$^5$ .............................. F02P 5/14
[52] U.S. Cl. .................................. 123/425
[58] Field of Search .................. 123/425, 435; 73/35; 364/431.08

[56] References Cited

U.S. PATENT DOCUMENTS 4,509,331  4/1985  Hirabayashi ................. 60/602
4,586,475  5/1986  Takahashi et al. ........... 123/425
4,630,584  12/1986  Higashiyama et al. ........ 123/425

Primary Examiner—Tony M. Argenbright
Attorney, Agent, or Firm—Foley & Lardner, Schwartz, Jeffery, Schwaab, Mack, Blumenthal & Evans

[57] ABSTRACT

A spark advance control system includes a high octane value spark advance schedule and a regular octane value spark advance schedule, respectively including advance limits and retard limits at different spark advance angles. Spark advance control schedules are selected during normal spark advance control operation. The high octane value spark advance schedule is selected when spark advance is maintained at an angular value higher than a predetermined regular-to-high octane value schedule switching, which is set near an advance limit in the regular octane value spark advance schedule. In the alternative, the regular octane value spark advance schedule is selected when spark advance is maintained at an angular value lower than a predetermined high-to-regular octane value schedule switching criterion, which is set near the retard limit in the high octane value spark advance schedule. The spark advance control schedule selection set forth above successfully avoids uncomfortably rapid and substantial changes of engine output characteristics, even when the gasoline type is changed.

10 Claims, 3 Drawing Sheets

KNOCK-SUPPRESSIVE SPARK IGNITION TIMING CONTROL SYSTEM FOR AN INTERNAL COMBUSTION ENGINE WITH A VARIABLE RETARD LIMIT

BACKGROUND OF THE INVENTION

1. Field of the Invention

The present invention relates generally to a spark ignition timing control system for an internal combustion engine, especially for the an internal combustion engine using gasoline as a fuel. More specifically, the invention relates to a spark ignition control system which is effective for suppressing engine knocking and has variable knocking responsive spark advance control characteristics depending on the grade of gasoline used.

2. Description of the Background Art

Recently, a greater variety of gasoline for internal combustion engines has become available. For instance, an unleaded and high octane value gasoline is becoming popular due to low exhaust emission and high engine performance. One advantage of such high octane value gasoline is high knocking suppressing capability to allow spark advance to be maintained at a relatively advanced angle for higher engine performance. Because of this high knocking suppressing capability, the angular range of spark advance for such high octane value gasoline can be shifted toward the advance side in comparison with that of regular octane value gasoline. In other words, as long as the spark advance variation range is held in a range for regular octane value gasoline, spark advance cannot be advanced beyond the advance limit set for regular octane value gasoline, even when high octane value gasoline is used. On the other hand, when the spark advance angular region is set to effectively use high octane value gasoline, a knock suppressing spark advance retarding magnitude, when regular octane value gasoline is used, becomes insufficient and causes substantial engine knocking and engine damage.

In view of this, Japanese Patent First (unexamined) Publication (Tokkai) Showa No. 60-212673 proposes a variable spark advance variation range including one spark advance control schedule adapted for high octane value gasoline, which will be hereafter referred to as a "high octane value spark advance schedule", and spark advance control schedule adapted for regular octane value gasoline which will be hereafter referred to as a "regular octane value spark advance schedule". The disclosed system further introduces automatic gasoline discrimination capability by initially selecting the regular octane value spark advance schedule. In discrimination stage operation, the spark advance is advanced until unacceptably heavy engine knocking is detected. An angular position at which unacceptably heavy knocking is detected is latched. The spark advance at which heavy engine knocking is monitored will be hereafter referred to as a "knocking spark advance point". Discrimination of gasoline the used is performed on the basis of the latched knocking spark advance point. Namely, because of different knocking suppressive capabilities between the high octane value gasoline and regular octane value gasoline, the knocking spark advance point is different, and discrimination is made by comparing a monitored knocking spark advance point with a criterion which may be set near the possible most advanced spark advance angle in a regular octane value spark advance schedule.

Though such a system works successfully in discriminating the kind of gasoline and in selecting one of the high octane value spark advance schedule and the regular octane value spark advance schedule, it necessarily causes a sudden change of the spark advance control schedule when the gasoline to be used is varied. This may cause a substantial change in engine output performance and give unacceptably an uncomfortable engine drive feeling to the driver. For instance, when the kind of gasoline is switched from high octane value gasoline to regular octane value gasoline, the spark advance control schedule is switched from the high octane value spark advance schedule to the regular octane value spark advance schedule to retard the variation range of spark advance. This causes a lowering of the engine output performance and degradation of the vehicular acceleration characteristics.

SUMMARY OF THE INVENTION

Therefore, it is an object of the present invention to provide a spark ignition timing control system which has a variable spark advance control schedule including at least a high octane value spark advance schedule and a regular octane value spark advance schedule which prevents spark advance from being rapidly changed even when the spark advance control schedule has to be switched.

Another object of the present invention is to provide spark advance control schedule selection which allows a moderate transition in switching the spark advance control schedule between the high octane value spark advance schedule and the regular octane value schedule to avoid a substantial change of spark advance.

A further object of the present invention is to provide knock suppressive spark advance control with a variable spark advance control schedule, which can optimize a spark advance variation range depending upon the kind of gasoline used without causing an uncomfortably rapid change of engine driving characteristics even when the gasoline is switched.

In order to accomplish aforementioned and other objects, a spark advance control system, according to the present invention, includes a high octane value spark advance schedule and a regular octane value spark advance schedule, respectively including advance limits and retard limits at different spark advance angles. Spark advance control schedules are selected during normal spark advance control operation. The high octane value spark advance schedule is selected when spark advance is maintained at angular values higher than a predetermined regular-to-high octane value schedule switching criterion which is set near the advance limit in the regular octane value spark advance schedule. In the alternative, a regular octane value spark advance schedule is selected when the spark advance is maintained at an angular value lower than a predetermined high-to-regular octane value schedule switching criterion which is set near the retard limit in the high octane value spark advance schedule.

The spark advance control schedule selection set forth above will successfully avoid uncomfortably rapid and substantial changes of the engine output characteristics even when the gasoline is changed.

According to one aspect of the invention, a spark ignition timing control system for an internal combustion engine comprises a spark ignition system for initiating spark ignition in an engine cylinder at a controlled timing, a sensor means for monitoring preselected spark ignition control parameters for producing an engine driving condition indicative sensor signal, a detector means for detecting an engine knocking condition to produce an engine knocking indicative detector signal, means for setting a first spark advance control schedule defining a first basic spark advance variable depending upon the value of the engine driving condition indicative sensor signal and having a first advance limit and a first retard limit which define a first variation range of spark advance in relation to the basic spark advance, means for setting a second spark advance control schedule defining a second basic spark advance variable depending upon the value of the engine driving condition indicative sensor signal and having a second advance limit and a second retard limit which define a second variation range of spark advance in relation to the basic spark advance, the second variation range being set in a range shifted to the advance side in comparison with the first variation range and partly overlapping the first variation range, and means, periodically operable, for deriving a spark advance according to a selected one of the first and second spark advance control schedules for advancing spark advance at a predetermined advancing magnitude at every operation cycle while the engine knocking indicative detector signal is absent and responsive to the engine knocking indicative detector signal to retard spark advance at a predetermined retarding magnitude at every operation cycle, the spark advance deriving means detecting spark advance within a predetermined schedule switching zone to alter selection of the first and second spark advance control schedules when spark advance is maintained within the schedule switching zone for a given period of time.

In practical control, the schedule switching zone is set relative to a basic spark advance derived according to a currently used one of the first and second spark advance control schedules.

In practical operation, the spark advance deriving means operates in a first mode in which the first spark advance control schedule is used, to detect spark advance within a first schedule switching zone defined between the first advance limit and a first switching criterion determined relative to the first basic spark advance and being smaller than the first advance limit to alter the spark advance control schedule to use to the second spark advance control schedule when the spark advance is maintained within the schedule switching zone for a first given period, and the spark advance deriving means operates in a second mode in which the second spark advance control schedule is used, to detect spark advance within a second schedule switching zone defined between the second retard limit and a second switching criterion determined relative to the second basic spark advance and being greater than the second advance limit to alter the spark advance control schedule to use to the first spark advance control schedule when the spark advance is maintained within the schedule switching zone for a second given period.

According to another aspect of the invention, a spark ignition timing control system for an internal combustion engine utilizing gasoline as fuel, comprises a spark ignition system for initiating spark ignition in an engine cylinder at a controlled timing, a sensor means for monitoring a preselected spark ignition control parameter for producing an engine driving condition indicative sensor signal, a detector means for detecting an engine knocking condition to produce an engine knocking indicative detector signal, and a control unit including means for setting a regular octane value gasoline adapted spark advance control schedule adapted for a regular octane value gasoline and defining a regular octane value gasoline adapted basic spark advance variable depending upon the value of the engine driving condition indicative sensor signal and having a regular octane value gasoline adapted advance limit and a regular octane value gasoline adapted retard limit which define a regular octane value gasoline adapted variation range of spark advance in relation to the basic spark advance, means for setting a high octane value gasoline adapted spark advance control schedule adapted for a high octane value gasoline having a higher octane value than the regular octane value gasoline and defining a high octane value gasoline adapted basic spark advance variable depending upon the value of the engine driving condition indicative sensor signal and having a high octane value gasoline adapted advance limit and a high octane value gasoline adapted retard limit which define a high octane value gasoline adapted variation range of spark advance in relation to the basic spark advance, the high octane value gasoline adapted variation range being set in a range shifted in to an advance side in comparison with the regular octane value gasoline adapted variation range and partly overlapping the regular octane value gasoline adapted variation range, means, periodically operable, for deriving a spark advance according to a selected one of the regular octane value gasoline adapted and high octane value gasoline adapted spark advance control schedules for advancing spark advance in a predetermined advancing magnitude at every operation cycle while the engine knocking indicative detector signal is absent and responsive to the engine knocking indicative detector signal to retard spark advance in a predetermined retarding magnitude at every operation cycle, the spark advance deriving means detecting spark advance within a predetermined schedule switching zone to alter selection of the regular octane value gasoline adapted and a high octane value gasoline adapted spark advance control schedule when spark advance is maintained within the schedule switching zone for a given period of time.

DESCRIPTION OF THE PREFERRED EMBODIMENT

Figure 1:
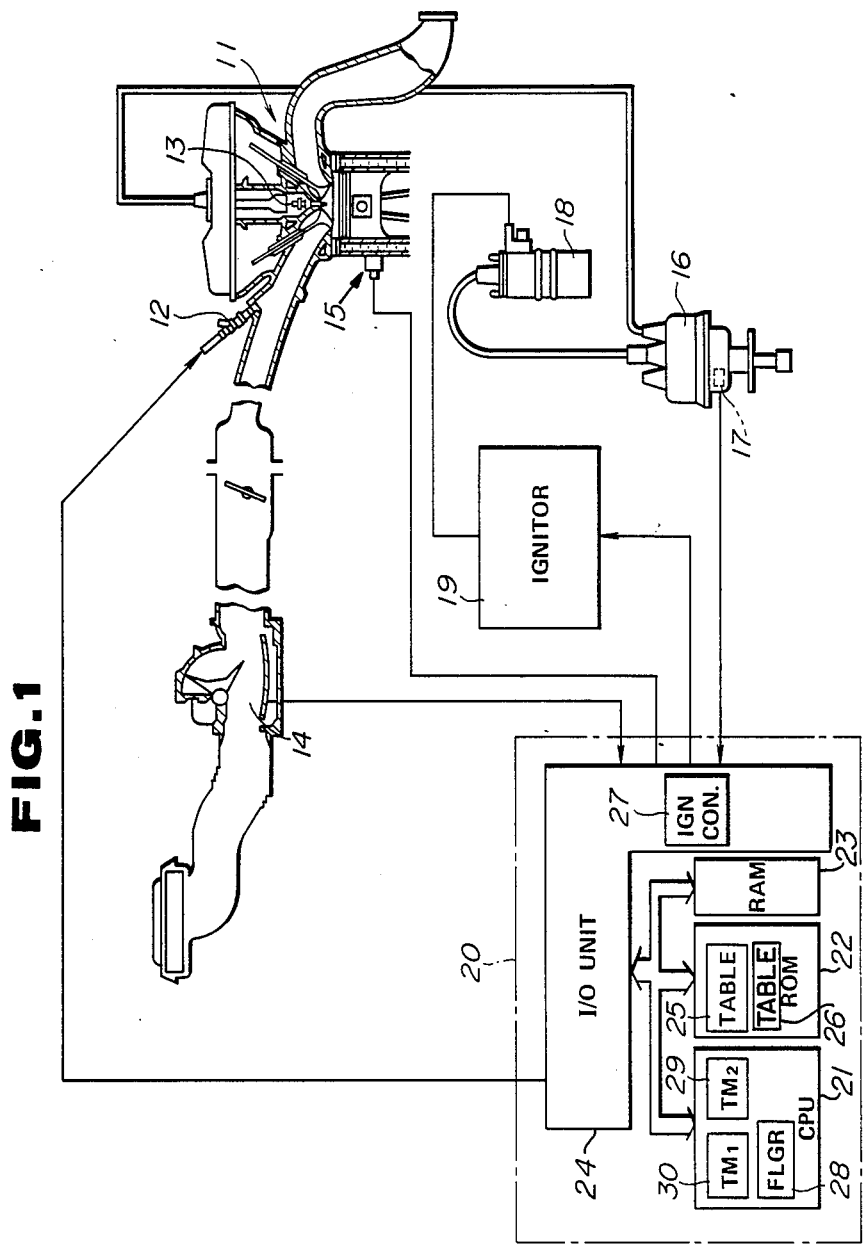
FIG. 1 is a schematic block diagram of the preferred embodiment of a spark ignition timing control system, according to the present invention.

Referring now to the drawings, particularly to FIG. 1, the preferred embodiment of a spark ignition control system, according to the present invention, is applicable to any internal combustion engine which uses gasoline as a fuel. The shown example of the internal combustion engine 11 is a fuel injection internal combustion engine having a fuel injection valve 12 and a spark ignition plug 13. The engine 11 has an air induction system including a throttle chamber, in which a throttle valve for adjusting air induction is disposed in a known manner, and an air flow meter 14. The air flow meter 14 monitors an intake air flow rate to produce an intake air flow rate indicative sensor signal indicative of the monitored intake air flow rate. The intake air flow rate is a spark advance adjusting parameter representative of an engine load Q. The engine is also associated with an exhaust system for discharging exhaust gas to the atmosphere.

A knocking sensor 15 is provided in an engine cylinder block for detecting engine knocking to produce an engine knocking indicative sensor signal. In the shown example, the knocking sensor 15 employed in the shown example is plugged in the engine cylinder block to monitor vibration of the latter to detect engine knocking on the basis of the frequency and magnitude of engine cylinder block vibration. The manner of detection of the engine knocking vibration utilizing a knocking sensor 15 is well known. If necessary, the knocking sensor and its operation disclosed in the U.S. Pat. No. 4,509,331 issued on April 9, 1985 and commonly assigned to assignee of the present invention, is herein incorporated by reference for the sake of disclosure.

The spark plug 13 is connected to a distributor 16 which is, in turn, connected to an ignition coil 18. A crank angle sensor 17 is disposed within the distributor 16 to produce a crank reference signal $\theta_{ref}$ at every predetermined angular position of a crankshaft, i.e. 70° before top-dead-center (BTDC) and a crank position signal $\theta_{pos}$ at every predetermined angular displacement of the crankshaft, e.g. every 1°. The crank reference signal $\theta_{ref}$ or crank position signal $\theta_{pos}$ is used as an engine speed indicative parameter to derive an engine revolution speed N on the basis thereon. For example, if the crank reference signal is used for deriving the engine speed N, an interval between occurrence of the crank reference signal is measured and the reciprocal of the interval is used as the engine speed indicative data. On the other hand, when the crank position signal is used for deriving the engine speed, the occurrence of the crank position signals is counted within a given period or a period to count the occurrence of a given number of crank position signals is measured, so as to derived the engine speed based thereon.

The air flow sensor 14, the knocking sensor 15 and the crank angle sensor 17 are connected to a control unit 20 which comprises a microprocessor. The control unit 20 is connected to the fuel injection valve 12 to feed a fuel injection control signal for controlling fuel injection timing and the fuel injection amount. The control unit 20 is also connected to a transistor ignitor 19 which is connected to a primary winding of the ignition coil 18 to generate secondary ignition power in the ignition coil at a controlled timing.

It should be appreciated that the control unit 20 may also be connected to various sensors, such as an engine coolant temperature sensor, a throttle angle sensor, a transmission gear position sensor and so forth to receive therefrom correction parameter indicative signals. However, since such correction factors and the process of correction of the spark ignition timing is not essential to discuss the present invention, the disclosure of such additional elements is not described in detail in order to simplify the disclosure.

In addition, though the shown embodiment employs the air flow meter for detecting the engine load condition, it is possible to use other parameter to represent the engine load condition. For example, throttle angle indicative data can be used as the engine load data. This throttle angle indicative data is advantageous to use as the engine load parameter because this feature is not influenced by pulsatile flow of the intake air.

Figure 2:
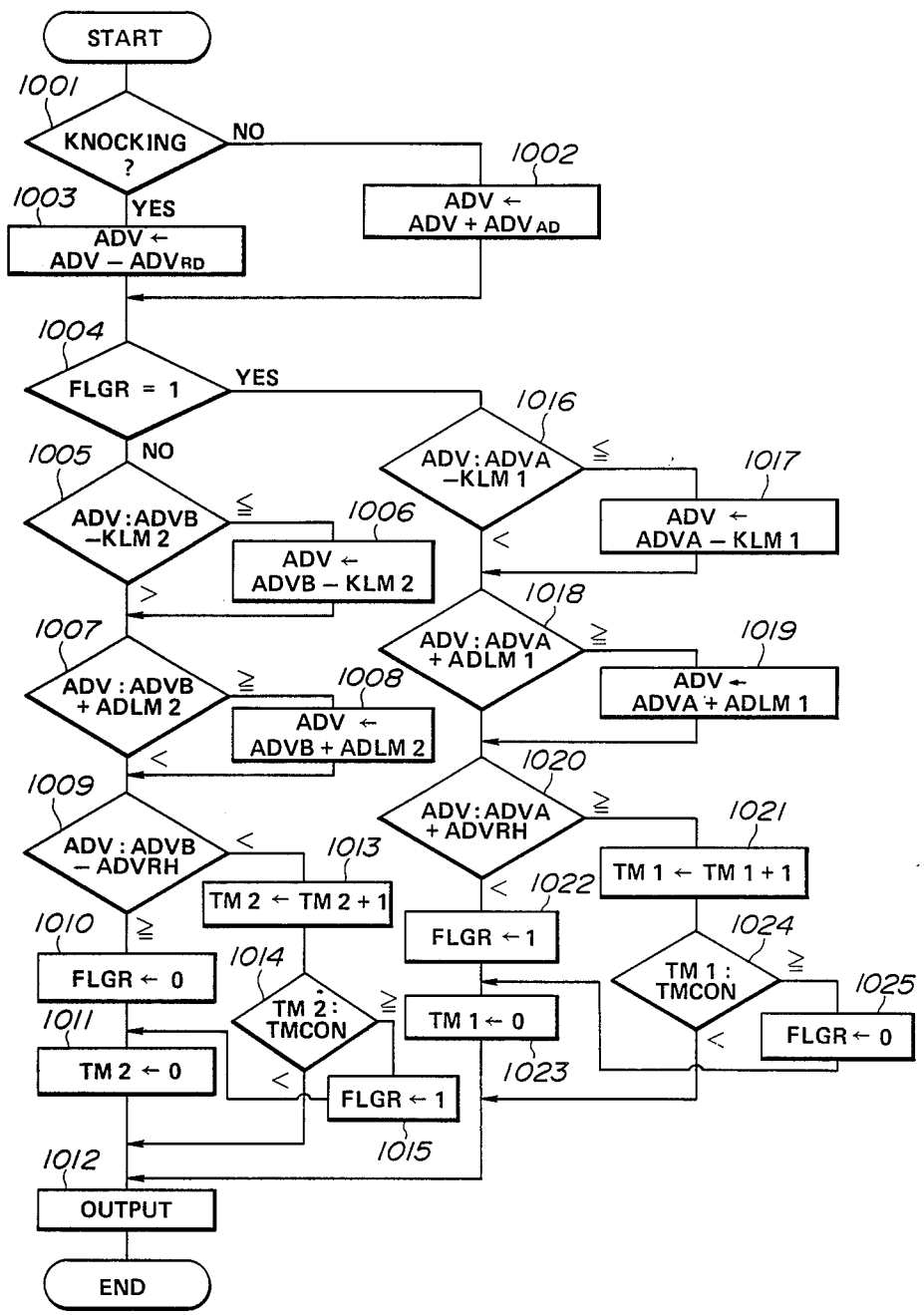
FIG. 2 is a flowchart of a knock suppressive spark advance derivation routine for implementing the preferred process of knock suppressive spark ignition control having variable control characteristics depending upon the kind of gasoline used.

As shown in FIG. 1, the control unit 20 comprises CPU 21, ROM 22, RAM 23 and an input/output unit 24. ROM 22 stores a plurality of control programs including a spark advance derivation routine which is shown in FIG. 2. Spark advance tables 25 and 26 are stored one of ROM 22 and RAM 23. The table 25 defines a high octane value spark advance schedule including advance limit $ADLM_2$ and retard limit $KLM_2$. On the other hand, table 26 defines a regular octane value spark advance schedule including advance limit $ADLM_1$ and retard limit $KLM_1$. Furthermore, the high octane value spark advance schedule and the regular octane value spark advance schedule define a basic spark advance which is to be derived on the basis of engine speed data N and engine load indicative data. In the shown embodiment, as the engine load indicative data, a Tp value ($= K \times Q/N$) is used. The basic spark advance derived utilizing the high octane value spark advance schedule will be hereafter referred to as a "high octane value basic spark advance ADVB". The basic spark advance derived utilizing the regular octane value spark advance schedule will be hereafter referred to as a "regular octane value basic spark advance ADVA".

On the other hand, the input/output unit 24 includes a spark ignition control section 27 which includes a register in which spark advance data is set as ignition spark timing indicative data, and a counter for counting the crank position signal. A trigger signal for triggering the transistor ignitor 19 is output from the input/output unit 24 when the counter value becomes equal to the set spark advance data value.

The process of derivation of the spark advance to set in the register in the input/output unit 24 will be discussed herebelow with reference to FIG. 2. The shown routine is cyclically or periodically executed at given a timing, at every predetermined angle of crankshaft angular displacement, e.g. 120°. Therefore, the shown routine in FIG. 2 is established as an interrupt program to be executed by interrupting a main program as a background job which governs various routines.

Immediately after starting execution, the engine knocking indicative sensor signal from the knocking sensor 15 is checked at a step 1001 to determine whether engine knocking is present or not. When the engine knocking condition is not detected as checked at the step 1001, a spark advance ADV which was derived in the immediately preceding execution cycle is modified by advancing spark advance by a given magnitude $ADV_{AD}$, at a step 1002. Then, at the step 1002, the spark advance modified by advancing the preceding spark advance ADV by the given magnitude $ADV_{AD}$ is stored as updated spark advance data. On the other hand, when the engine knocking condition is detected as checked at the step 1001, the spark advance ADV is modified by retarding by a given magnitude $ADV_{RD}$ to set the updating spark advance as updated data, at a step 1003.

After one of the steps 1002 and 1003, the process goes to a step 1004. At the step 1004, a regular mode indicative flag FLGR which is set in a flag register 28 in CPU 21 when the regular octane value spark advance schedule is selected. When the regular mode indicative flag FLGR is not set as checked at the step 1004, a judgement is made that the control mode is a high octane value mode for deriving spark advance utilizing the high octane value spark advance schedule in the table 25. Then, at a step 1005, the spark advance ADV updating in the step 1002 or 1003 is used to check whether the derived spark advance is excessively retarded across the retard limit $KLM_2$ with respect to the basic spark advance ADVB. Therefore, at the step 1005, the retarding limit value is derived by subtracting the retard limit $KLM_2$ from the basic spark advance ADVB which is derived on the basis of the engine speed data N and the Tp value as the engine load representing parameter. Then, the spark advance ADV is compared with the value $(ADVB - KLM_2)$ at the step 1005. When the spark advance ADV is smaller than or equal to the value $(ADVB - KLM_2)$, the spark advance is modified to the value corresponding to the value $(ADVB - KLM_2)$, at a step 1006.

After the step 1006 or when the spark advance ADV is greater than the value $(ADVB - KLM_2)$ as checked at the step 1005, the spark advance ADV is compared with an advance limit indicative value, at a step 1007. Similarly to the above, the advance limit indicative value is determined by adding the advance limit $ADLM_2$ to the basic spark advance ADVB. When the spark advance ADV is greater than or equal to the value $(ADVB + ADLM_2)$, the spark advance is modified to the value corresponding to the value $(ADVB + ADLM_2)$, at a step 1008.

After the step 1008 or when the spark advance ADV as checked at the step 1007 is smaller than the value $(ADVB + ADLM_2)$, the a criterion to switch selection of the spark advance control schedule from the high octane value spark advance schedule to the regular octane value spark advance schedule, which will be hereafter referred to as a "high-to-regular criterion", is determined by subtracting a predetermined value ADVRH from the basic spark advance ADVB, at a step 1009. Then, the spark advance ADV is compared with the high-to-regular criterion (ADVB−ADVRH). If the spark advance ADV as checked at the step 1009 is greater than or equal to the high-to-regular criterion (ADVB−ADVRH), then the regular mode indicative flag FLGR is reset at a step 1010 and subsequently a timer value $TM_2$ of a timer 29 which is in CPU 21 and is designed to measure an elapsed time while the spark advance ADV is maintained smaller than or equal to the value $(ADVB + ADLM_2)$ and greater than the high-to-regular criterion (ADVB−ADVRH) and will be hereafter referred to as a high-to-regular switching timer, is cleared at a step 1011. After the step 1011, the spark advance ADV is output and set in a register in the input/output unit 24, at a step 1012.

On the other hand, when the spark advance ADV as checked at the step 1009 is greater than the high-to-regular criterion (ADVB−ADVRH), the timer value $TM_2$ of the high-to-regular switching timer 29 is incremented by 1 at a step 1013. Thereafter, the high-to-regular switching timer value $TM_2$ is compared with a predetermined high-to-regular switching timer criterion TMCOM at a step 1014. When the high-to-regular switching timer value $TM_2$ is smaller than the high-to-regular switching timer criterion TMCOM as checked at the step 1014, the process jumps to the step 1012. On the other hand, when the high-to-regular switching timer value $TM_2$ is greater than or equal to the high-to-regular switching timer criterion TMCOM as checked at the step 1014, then the regular mode indicative flag FLGR is set at a step 1015 and thereafter the process jumps to the step 1011.

On the other hand, when the regular mode indicative flag FLGR is set as checked at the step 1004 and therefore, the judgement is made that the spark advance control is performed by utilizing the regular octane value spark advance schedule, the spark advance ADV is checked to determine whether the derived spark advance is excessively retarded across the retard limit $KLM_1$ with respect to the basic spark advance ADVA, at a step 1016. Therefore, at the step 1016, the retarding limit value is derived by subtracting the retard limit $KLM_1$ from the basic spark advance ADVA which is derived on the basis of the engine speed data N and the Tp value as the engine load representing parameter. Then, the spark advance ADV is compared with the value $(ADVA - KLM_1)$ at the step 1016. When the spark advance ADV is smaller than or equal to the value $(ADVA - KLM_1)$, the spark advance is modified to the value corresponding to the value $(ADVA - KLM_1)$, at a step 1017.

After the step 1017 or when the spark advance ADV is greater than the value $(ADVA - KLM_1)$ as checked at the step 1016, the spark advance ADV is compared with an advance limit indicative value, at a step 1018. Similarly to the above, the advance limit indicative value is determined by adding the advance limit $ADLM_1$ to the basic spark advance ADVA. When the spark advance ADV is greater than or equal to the value $(ADVA + ADLM_1)$, the spark advance is modified to the value corresponding to the value $(ADVA + ADLM_1)$, at a step 1019.

After the step 1019 or when the spark advance ADV as checked at the step 1018 is smaller than the value $(ADVA + ADLM_1)$, the criterion to switch the selection of the spark advance control schedule from the high octane value spark advance schedule to the regular octane value spark advance schedule, which will be hereafter referred to as a "regular-to-high criterion", is determined by adding the predetermined value ADVRH from the basic spark advance ADVA, at a step 1020. Then, the spark advance ADV is compared with the regular-to-high criterion (ADVA+ADVRH). If the spark advance ADV as checked at the step 1020 is smaller than the regular-to-high criterion (ADVB+ADVRH), then the regular mode indicative flag FLGR is set at a step 1022 and subsequently a timer value $TM_1$ of a timer 30 which is in CPU 21 and is designed to measure an elapsed time while the spark advance ADV is maintained smaller than or equal to the value $(ADVA + ADLM_1)$ and greater than the regular-to-high criterion (ADVA+ADVRH) and will be hereafter referred to as a regular-to-high switching timer, is cleared at a step 1023. After the step 1023, the spark advance ADV is output and set in the register in the input/output unit 24, at the step 1012.

On the other hand, when the spark advance ADV as checked at the step 1020 is greater than the high-to-regular criterion (ADVA+ADVRH), the timer value $TM_1$ of the regular-to-high switching timer 30 is incremented by 1 at a step 1021. Thereafter, the regular-to-high switching timer value $TM_1$ is compared with a predetermined regular-to-high switching timer criterion TMCOM at a step 1024. When the regular-to-high switching timer value $TM_1$ is smaller than the regular-to-high switching timer criterion TMCOM as checked at the step 1024, the process jumps to the step 1012. On the other hand, when the regular-to-high switching timer value $TM_1$ is greater than or equal to the regular-to-high switching timer criterion TMCOM as checked at the step 1024, then the regular mode indicative flag FLGR is reset at a step 1025 and thereafter the process jumps to the step 1023.

Figure 3:
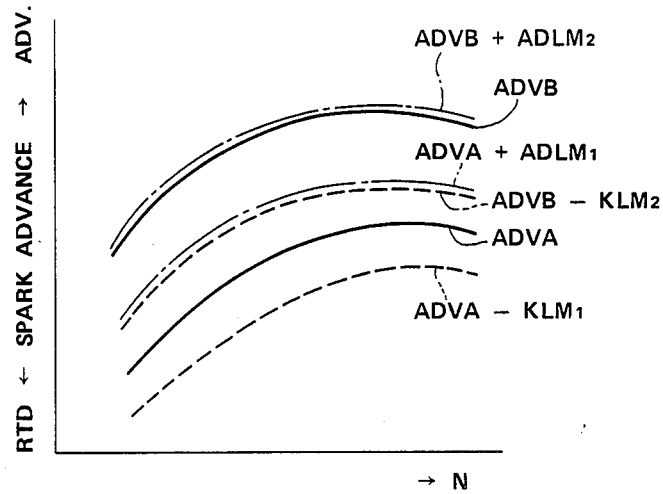
FIG. 3 is a chart showing the variation of advance and retard limits in a high octane value spark advance schedule and a regular octane value spark advance schedule, in relation to an engine revolution speed.

As seen from FIG. 3, the basic spark advance ADVB and ADVA varies as shown in relation to the engine speed N. The variation range of the spark advance in the high octane value spark advance schedule and the regular octane value spark advance schedule are set relative to the basic spark advances.

Figure 4:
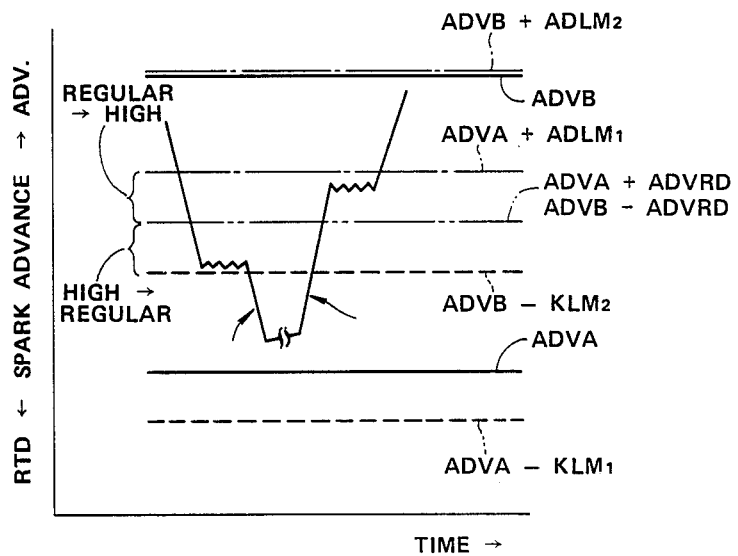
FIG. 4 is an explanatory timing chart showing selection of the high octane value spark advance schedule and regular octane value spark advance schedule.

As seen from FIG. 4, practical control is performed when the spark advance is controlled utilizing the high octane value spark advance schedule, by switching the control schedule to the regular octane value spark advance schedule when the spark advance ADV is maintained in a regular-to-high switching zone defined by the value (ADVB−ADVRH) and the value (ADVB−KLM$_2$) for a period $TM_2$ longer than the regular-to-high switching timer criterion TMCOM. Similarly, when the spark advance is controlled utilizing the regular octane value spark advance schedule, switching the control schedule to the regular octane value spark advance schedule is performed when the spark advance ADV is maintained in a regular-to-high switching zone defined by the value (ADVA+ADVRH) and the value (ADVA−ADLM$_2$) for a period $TM_1$ longer than the regular-to-high switching timer criterion TMCOM.

As seen from FIGS. 3 and 4, since the variation range of spark advance in the high octane value spark advance schedule and the regular octane value spark advance schedule are partly overlapping, spark advance is moderately adjusted in the transition, and uncomfortably rapid and substantial changes in engine driving characteristics does not occur.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown example utilizes a common criterion in switching the control mode from a high octane value mode to a regular octane value mode and vice versa, it is possible to differentiate this valve so as to prevent operational mode selection from causing hunting.

Therefore, as will be clear from the discussion given hereabove, the present invention fulfills all of the objects and advantages sought therefor.

What is claimed is:

1. A spark ignition timing control system for an internal combustion engine, said spark ignition timing control system comprising:
   a spark ignition system initiating spark ignition in an engine cylinder at a controlled timing;
   a sensor monitoring a preselected spark ignition control parameter and producing an engine driving condition indicative sensor signal;
   a detector detecting an engine knocking condition and producing an engine knocking indicative detector signal;
   means for setting a first spark advance control schedule defining a first basic spark advance variable based upon a value of said engine driving condition indicative sensor signal and having a first advance limit and a first retard limit which define a first variation range of spark advance in relation to a basic spark advance;
   means for setting a second spark advance control schedule defining a second basic spark advance variable based upon a value of said engine driving condition indicative sensor signal and having a second advance limit and a second retard limit which define a second variation range of spark advance in relation to said basic spark advance, said second variation range being set in a range shifted in advance in comparison with said first variation range and partly overlapping said first variation range; and
   spark advance deriving means, periodically operable, for deriving spark advance in accordance with a selected one of said first and second spark advance control schedules and for advancing spark advance by a predetermined advancing magnitude at every operation cycle while said engine knocking indicative detector signal is absent and responsive to said engine knocking indicative detector signal to retard spark advance by a predetermined retarding magnitude at every operation cycle, said spark advance deriving means detecting spark advance within a predetermined schedule switching zone to alter selection of said first and second spark advance control schedules when spark advance is maintained within said schedule switching zone for a given period of time.

2. A spark ignition timing control system as set forth in claim 1, wherein said schedule switching zone is set relative to basic spark advance derived in accordance with a currently used one of said first and second spark advance control schedules.

3. A spark ignition timing control system as set forth in claim 2, wherein said spark advance deriving means operates in a first mode in which said first spark advance control schedule is used, to detect spark advance within said schedule switching zone defined between said first advance limit and a first switching criterion determined relative to said first basic spark advance and being smaller than said first advance limit to alter spark advance control to use said second spark advance control schedule when said spark advance is maintained within said schedule switching zone for a first given period.

4. A spark ignition timing control system as set forth in claim 2, wherein said spark advance deriving means operates in a second mode in which said second spark advance control schedule is used, to detect spark advance within said schedule switching zone defined between said second retard limit and a second switching criterion determined relative to said second basic spark advance and being greater than said second advance limit to alter spark advance control to use said first spark advance control schedule when said spark advance is maintained within said schedule switching zone for a second given period.

5. A spark ignition timing control system as set forth in claim 2, wherein said spark advance deriving means operates in a first mode in which said first spark advance control schedule is used, to detect spark advance within a first schedule switching zone defined between said first advance limit and a first switching criterion determined relative to said first basic spark advance and being smaller than said first advance limit to alter spark advance control to use said second spark advance control schedule when said spark advance is maintained within said schedule switching zone for a first given period, and said spark advance deriving means operates in a second mode in which said second spark advance control schedule is used, to detect spark advance within a second schedule switching zone defined between said second retard limit and a second switching criterion determined relative to said second basic spark advance and being greater than said second advance limit to alter spark advance control to use said first spark advance control schedule when said spark advance is maintained within said schedule switching zone for a second given period.

6. A spark ignition timing control system for an internal combustion engine utilizing gasoline as fuel, said spark ignition timing control system comprising:
a spark ignition system initiating spark ignition in an engine cylinder at a controlled timing;
a sensor monitoring a preselected spark ignition control parameter and producing an engine driving condition indicative sensor signal;
a detector detecting an engine knocking condition to produce an engine knocking indicative detector signal; and
a control unit including,
means for setting a regular octane value gasoline adapted spark advance control schedule adapted for a regular octane value gasoline and defining a regular octane value gasoline adapted basic spark advance variable based upon a value of said engine driving condition indicative sensor signal and having a regular octane value gasoline adapted advance limit and a regular octane value gasoline adapted retard limit which define a regular octane value gasoline adapted variation range of spark advance in relation to a basic spark advance;
means for setting a high octane value gasoline adapted spark advance control schedule adapted for a high octane value gasoline having a higher octane value than said regular octane value gasoline and defining a high octane value gasoline adapted basic spark advance variable based upon a value of said engine driving condition indicative sensor signal and having a high octane value gasoline adapted advance limit and a high octane value gasoline adapted retard limit which define a high octane value gasoline adapted variation range of spark advance in relation to said basic spark advance, said high octane value gasoline adapted variation range being set in a range shifted in advance in comparison with said regular octane value gasoline adapted variation range and partly overlapping said regular octane value gasoline adapted variation range;
spark advance deriving means, periodically operable, for deriving spark advance in accordance with a selected one of said regular octane value gasoline adapted and high octane value gasoline adapted spark advance control schedules for advancing spark advance by a predetermined advancing magnitude at every operation cycle while said engine knocking indicative detector signal is absent and responsive to said engine knocking indicative detector signal to retard spark advance by a predetermined retarding magnitude at every operation cycle, said spark advance deriving means detecting spark advance within a predetermined schedule switching zone to alter selection of said regular octane value gasoline adapted and high octane value gasoline adapted spark advance control schedules when spark advance is maintained within said schedule switching zone for a given period of time.

7. A spark ignition timing control system as set forth in claim 6, wherein said schedule switching zone is set relative to basic spark advance derived in accordance with a currently used one of said regular octane value gasoline adapted and high octane value gasoline adapted spark advance control schedules.

8. A spark ignition timing control system as set forth in claim 7, wherein said spark advance deriving means operates in a regular octane value gasoline adapted mode in which said regular octane value gasoline adapted spark advance control schedule is used, to detect spark advance within said schedule switching zone defined between said regular octane value gasoline adapted advance limit and a regular octane value gasoline adapted switching criterion determined relative to said regular octane value gasoline adapted basic spark advance and being smaller than said regular octane value gasoline adapted advance limit to alter spark advance control to use said high octane value gasoline adapted spark advance control schedule when said spark advance is maintained within said schedule switching zone for a regular octane value gasoline adapted given period.

9. A spark ignition timing control system as set forth in claim 7, wherein said spark advance deriving means operates in a high octane value gasoline adapted mode in which said high octane value gasoline adapted spark advance control schedule is used, to detect spark advance within said schedule switching zone defined between said high octane value gasoline adapted retard limit and a high octane value gasoline adapted switching criterion determined relative to said high octane value gasoline adapted basic spark advance and being greater than said high octane value gasoline adapted advance limit to alter spark advance control to use said regular octane value gasoline adapted spark advance control schedule when said spark advance is maintained within said schedule switching zone for a high octane value gasoline adapted given period.

10. A spark ignition timing control system as set forth in claim 6, wherein said spark advance deriving means operates in a regular octane value gasoline adapted mode in which said regular octane value gasoline adapted spark advance control schedule is used, to detect spark advance within a regular octane value gasoline adapted schedule switching zone defined between said regular octane value gasoline adapted advance limit and a regular octane value gasoline adapted switching criterion determined relative to said regular octane value gasoline adapted basic spark advance and being smaller than said regular octane value gasoline adapted advance limit to alter spark advance control to use said high octane value gasoline adapted spark advance control schedule when said spark advance is maintained within said schedule switching zone for a regular octane value gasoline adapted given period, and said spark advance deriving means operates in a high octane value gasoline adapted mode in which said high octane value gasoline adapted spark advance control schedule is used, to detect spark advance within a high octane value gasoline adapted schedule switching zone defined between said high octane value gasoline adapted retard limit and a high octane value gasoline adapted switching criterion determined relative to said high octane value gasoline adapted basic spark advance and being greater than said high octane value gasoline adapted advance limit to alter spark advance control to use said regular octane value gasoline adapted spark advance control schedule when said spark advance is maintained within said schedule switching zone for a high octane value gasoline adapted given period.

* * * * *